(12) United States Patent
Jeon et al.

(10) Patent No.: US 11,101,959 B2
(45) Date of Patent: Aug. 24, 2021

(54) EXPIRATION HANDLING OF TWO-STAGE GRANT VALIDITY DURATION

(71) Applicant: Apple Inc., Cupertino, CA (US)

(72) Inventors: Jeongho Jeon, San Jose, CA (US); Seau S. Lim, Swindon SWD (GB); Youn Hyoung Heo, San Jose, CA (US); Seunghee Han, San Jose, CA (US); Hwan-Joon Kwon, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/487,788

(22) PCT Filed: Mar. 22, 2018

(86) PCT No.: PCT/US2018/023865
§ 371 (c)(1),
(2) Date: Aug. 21, 2019

(87) PCT Pub. No.: WO2018/175795
PCT Pub. Date: Sep. 27, 2018

(65) Prior Publication Data
US 2020/0052856 A1 Feb. 13, 2020

Related U.S. Application Data

(60) Provisional application No. 62/476,058, filed on Mar. 24, 2017.

(51) Int. Cl.
*H04L 5/00* (2006.01)
*H04W 72/04* (2009.01)
*H04W 76/28* (2018.01)

(52) U.S. Cl.
CPC .......... *H04L 5/0053* (2013.01); *H04L 5/001* (2013.01); *H04L 5/0042* (2013.01);
(Continued)

(58) Field of Classification Search
CPC ......... H04L 1/0027; H04L 5/00; H04L 5/001; H04L 5/0042; H04L 5/0048;
(Continued)

(56) References Cited

U.S. PATENT DOCUMENTS 9,839,011 B2 * 12/2017 Aiba .................. H04W 76/27
9,860,880 B2 * 1/2018 Yokomakura ......... H04W 72/12
(Continued)

OTHER PUBLICATIONS

PCT International Preliminary Report in International Appln. No. PCT/US2018/023865, dated Oct. 3, 2019, 8 pages.
(Continued)

*Primary Examiner* — Tri H Phan
(74) *Attorney, Agent, or Firm* — Fish & Richardson P.C.

(57) ABSTRACT

Embodiments of the present disclosure may include monitoring, at a physical layer, for a physical uplink shared channel (PUSCH) trigger for a PUSCH transmission, determining, at the physical layer, the PUSCH trigger is not received, wherein a wireless communication device is not to perform the PUSCH transmission based on the determination that the PUSCH trigger is not received, and considering, at a medium access control (MAC) entity, the PUSCH transmission to have been performed. Other embodiments may be described and/or claimed.

21 Claims, 10 Drawing Sheets

(52) U.S. Cl.
CPC ......... *H04L 5/0048* (2013.01); *H04W 72/042* (2013.01); *H04W 76/28* (2018.02)

(58) Field of Classification Search
CPC .................. H04L 5/0053; H04L 5/0091; H04L 29/08018; H04L 29/08963; H04W 72/04; H04W 72/042; H04W 76/28
See application file for complete search history.

(56) References Cited

U.S. PATENT DOCUMENTS

| | | | |
|---|---|---|---|
| 10,455,570 B2* | 10/2019 | Babaei | H04W 72/042 |
| 10,638,467 B2* | 4/2020 | Nogami | H04W 52/54 |
| 2016/0219618 A1 | 7/2016 | Rico Alvarino et al. | |
| 2020/0029385 A1* | 1/2020 | Bergstrom | H04W 72/1289 |
| 2020/0068605 A1* | 2/2020 | Golitschek Edler von Elbwart | H04W 72/1289 |

OTHER PUBLICATIONS

International Patent Office—International Search Report and Written Opinion dated Jun. 25, 2018, from International Application No. PCT/US2018/023865, 15 pages.

Nokia et al., "2-step scheduling and multi subframe scheduling for eLAA," 3GPP TSG-RAN WG2 Meeting #96, R2-168571, Change Request 36.321 CR 0971. Current version: 14.0.0, Nov. 14-18, 2016, Reno, USA, 7 pages.

3GPP, "Technical Specification Group Radio Access Network; Evolved Universal Terrestrial Radio Access (E-UTRA); Medium Access Control (MAC) protocol specification (Release 14)," 3GPP TS 36.321 V14.2.0 (Mar. 2017), Lte Advanced Pro, 106 pages.

3GPP, "Technical Specification Group Radio Access Network; Evolved Universal Terrestrial Radio Access (E-UTRA); Physical layer procedures (Release 14)," 3GPP TS 36.213 V14.2.0 (Mar. 2017), Lte Advanced Pro, 454 pages.

* cited by examiner

EXPIRATION HANDLING OF TWO-STAGE GRANT VALIDITY DURATION

RELATED APPLICATION

This application is a national phase entry under 35 U.S.C. § 371 of International Application No. PCT/US2018/023865, filed Mar. 22, 2018, entitled "EXPIRATION HANDLING OF TWO-STAGE GRANT VALIDITY DURATION," which claims the benefit of priority of U.S. Provisional Patent Application Ser. No. 62/476,058, filed Mar. 24, 2017, entitled "EXPIRATION HANDLING OF TWO-STAGE GRANT VALIDITY DURATION METHOD AND APPARATUS," the entire disclosures of which are hereby incorporated by reference.

TECHNICAL FIELD

The present disclosure relates generally to the field of wireless communications, and more specifically to physical uplink shared channel (PUSCH) transmissions.

BACKGROUND

A two-stage grant operation may be used for PUSCH transmissions in some contexts, such as enhanced licensed assisted access (eLAA).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
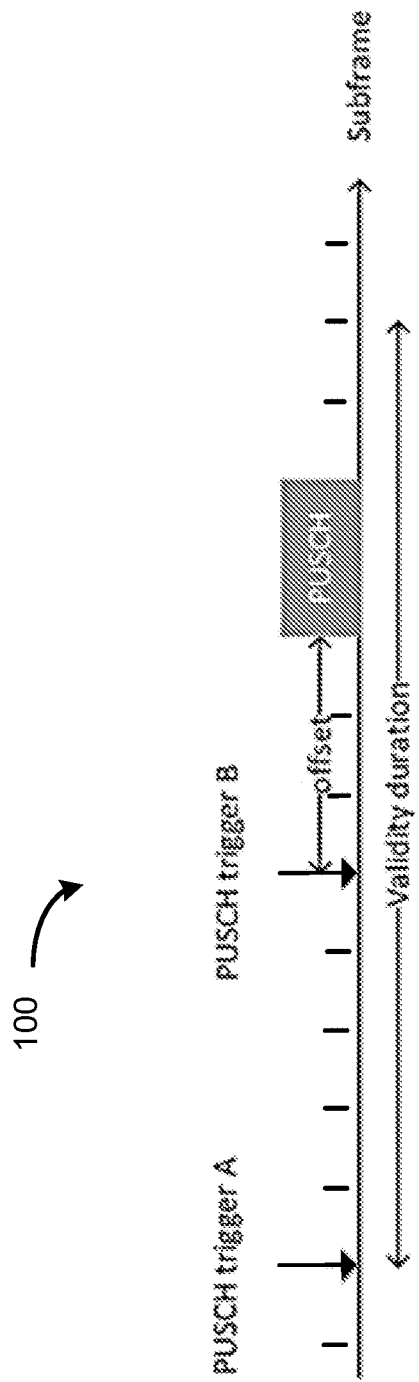
FIG. 1 illustrates a two-stage grant operation, in accordance with various embodiments.

Some embodiments may relate to techniques for handling the expiration of a two-stage grant validity duration for a physical uplink shared channel (PUSCH) transmission.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

FIG. 1 illustrates a two-stage grant operation 100, in accordance with various embodiments. In some embodiments, a downlink control information (DCI) transmission may include a single bit to indicate whether an uplink (UL) grant is a triggered grant. This may be considered a first step of the two-stage grant operation 100, and is denoted as PUSCH trigger A. In some embodiments, the PUSCH trigger A may be received in a DCI with format 0A, 4A, 0B, 4B, or any other suitable DCI format. In various embodiments, if the PUSCH trigger A indicates that it is a triggered grant, a user equipment (UE) may transmit after receiving a single bit trigger, which is denoted as PUSCH trigger B. In various embodiments, the PUSCH trigger B may be received in a physical downlink control channel (PDCCH) DCI scrambled with a Common Control Radio Network Temporary Identifier CC-RNTI in a subframe received after a subframe carrying the UL grant, or in any other suitable manner.

A timing between the PUSCH trigger B, transmitted in a subframe N, and an earliest UL transmission may be based on a UE capability, which may be 1, 2, or 3 subframes in various embodiments. If DCI 0A/4A/0B/4B indicates a two-stage grant, a first two bits of a timing offset field may indicate a timing offset between the PUSCH trigger B and the PUSCH transmission. This is illustrated in Table 1 below, which also appears in Third Generation Partnership Project (3GPP) Technical Specification (TS) 36.213, Release 14, version 14.2.0, March 2017, section 8 as Table 8-2e. The offset is shown as a value k in subframes for each combination of the first two bits of the timing offset field.

TABLE 1 for DCI format 0A/0B/4A/4B with 'PUSCH trigger A' field set to '1'.

| Value of 'scheduling delay' field | k |
| --- | --- |
| 00 | 0 |
| 01 | 1 |
| 10 | 2 |
| 11 | 3 |

The last two bits of the timing offset field may indicate a validity duration for the two-stage grant. That is, if PUSCH trigger B is not received within the validity duration after the PUSCH trigger A is received, then the PUSCH trigger A is voided. The validity duration is captured in Table 2 below, which also appears in $3^{rd}$ Generation Partnership Project (3GPP) Technical Specification (TS) 36.213, Release 14, version 14.2.0, March 2017, section 8 as Table 8.2f. The validity duration is shown as a value v in subframes for each combination of the last two bits of the timing offset field.

TABLE 2 for DCI format 0A/0B/4A/4B with 'PUSCH trigger A' field set to '1'.

| Value of 'validity duration' field | v |
| --- | --- |
| 00 | 8 |
| 01 | 12 |
| 10 | 16 |
| 11 | 20 |

Various embodiments may relate to UE behavior upon the expiration of the validity duration and/or to UE behavior when PUSCH trigger B is not received.

In License Assisted Access (LAA), it is possible that PUSCH is not transmitted due to failure of Listen-Before-Talk (LBT). In this case a MAC entity of a UE may consider the transmission to have been performed anyway.

In various embodiments, handling of expiration of the validity duration may be the same as the LBT failure case. That is, the UE MAC may treat it as a hybrid automatic repeat request (HARQ) retransmission. In other words, the UE MAC may assume that it has been transmitted and thus waits for retransmission. In some embodiments, the physical layer may perform a listen-before-talk procedure, according to which transmissions are not performed if the channel is identified as being occupied, or may monitor for PUSCH trigger B, according to which transmissions are not performed if the validity timer expires. In both cases, a MAC entity may consider the transmission to have been performed anyway, unless stated otherwise. In some embodiments, the physical layer may monitor for PUSCH trigger B, according to which transmissions are not performed if PUSCH trigger B is not received, but the MAC entity may consider the transmission to have been performed anyway.

In other embodiments, a special handling by the MAC layer may be performed as an aborted transmission by signaling the expiration of the validity duration from PHY to MAC layer.

In various embodiments, one of more components of FIGS. 2-9 may perform some or all of the actions described above with respect to handling expiration of the PUSCH validity timer duration and/or failure to receive the PUSCH trigger B. In some embodiments, one or more components of FIGS. 2-9 may be to: monitor for a PUSCH trigger for a PUSCH transmission; determine the PUSCH trigger is not received, wherein a wireless communication device is not to perform the PUSCH transmission based on the determination that the PUSCH trigger is not received; and consider, at a MAC entity, the PUSCH transmission to have been performed, even in cases where the PUSCH trigger is not received and/or the PUSCH validity timer duration has expired. In embodiments, the PUSCH trigger may be a PUSCH trigger B that may be a one bit trigger in a PDCCH DCI scrambled with a CC-RNTI. In embodiments, the MAC entity may start one or more discontinuous reception (DRX) timers (e.g., an inactivity timer, a retransmission timer, a short cycle timer, and/or any other suitable timer) and may monitor a PDCCH for the PUSCH trigger until the PUSCH validity timer expires.

Figure 2:
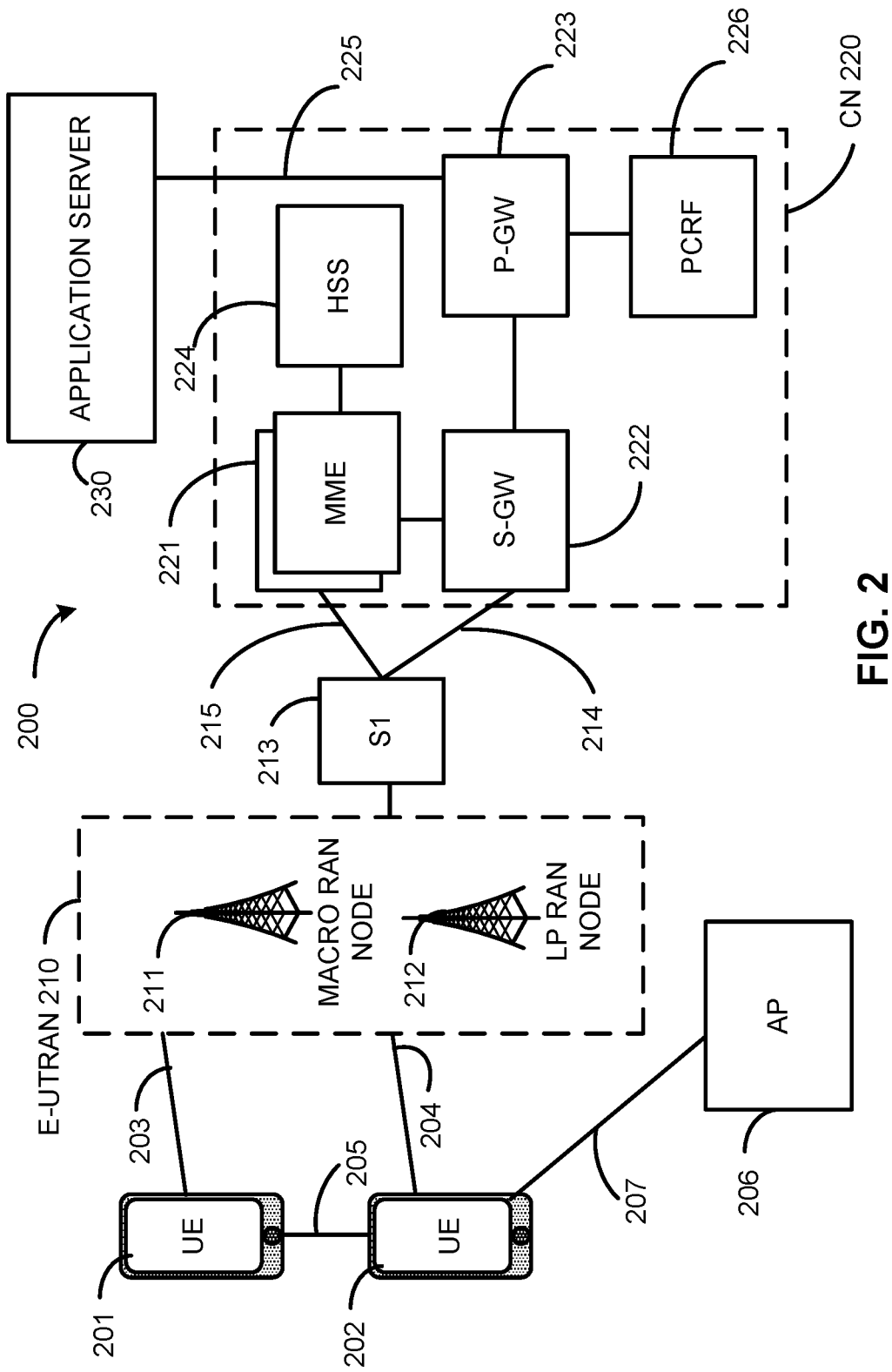
FIG. 2 illustrates an architecture of a system of a network, in accordance with some embodiments.

FIG. 2 illustrates an architecture of a system 200 of a network in accordance with some embodiments. The system 200 is shown to include a user equipment (UE) 201 and a UE 202. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 201 and 202 are illustrated as smartphones (e.g., handheld touch-screen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart"

appliances, machine-type communications (MTC) devices, machine-to-machine (M2M), Internet of Things (IoT) devices, and/or the like.

In some embodiments, any of the UEs 201 and 202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 201 and 202 may be configured to connect, e.g., communicatively couple, with a radio access network (RAN) 210—the RAN 210 may be, for example, an Evolved Universal Mobile Telecommunications System (UMTS) Terrestrial Radio Access Network (E-UTRAN), a NextGen RAN (NG RAN), or some other type of RAN. The UEs 201 and 202 utilize connections (or channels) 203 and 204, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 203 and 204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 201 and 202 may further directly exchange communication data via a ProSe interface 205. The ProSe interface 205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 205 may be used in vehicular applications and communications technologies, which are often referred to as V2X systems. V2X is a mode of communication where UEs (for example, UEs 201, 202) communicate with each other directly over the PC5/SL interface 105 and can take place when the UEs 201, 202 are served by RAN nodes 211, 212 or when one or more UEs are outside a coverage area of the RAN 210. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vUEs 201, 202, RAN nodes 211, 212, application servers 230, and pedestrian UEs 201, 202 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 201, 202 may be implemented/employed as Vehicle Embedded Communications Systems (VECS) or vUEs.

The UE 202 is shown to be configured to access an access point (AP) 206 (also referred to as also referred to as "WLAN node 206", "WLAN 206", "WLAN Termination 206" or "WT 206" or the like) via connection 207. The connection 207 can comprise a local wireless connection, such as a connection consistent with any IEEE 802.11 protocol, wherein the AP 206 would comprise a wireless fidelity (WiFi®) router. In this example, the AP 206 is shown to be connected to the Internet without connecting to the core network of the wireless system (described in further detail below). In various embodiments, the UE 202, RAN 210, and AP 206 may be configured to utilize LTE-WLAN aggregation (LWA) operation and/or WLAN LTE/WLAN Radio Level Integration with IPsec Tunnel (LWIP) operation. The LWA operation may involve the UE 202 in RRC_CONNECTED being configured by a RAN node 211, 212 to utilize radio resources of LTE and WLAN. LWIP operation may involve the UE 202 using WLAN radio resources (e.g., connection 207) via Internet Protocol Security (IPsec) protocol tunneling to authenticate and encrypt packets (e.g., internet protocol (IP) packets) sent over the connection 207. IPsec tunneling may include encapsulating entirety of original IP packets and adding a new packet header thereby protecting the original header of the IP packets.

The RAN 210 can include one or more access nodes that enable the connections 203 and 204. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 210 may include one or more RAN nodes for providing macrocells, e.g., macro RAN node 211, and one or more RAN nodes for providing femtocells or picocells (e.g., cells having smaller coverage areas, smaller user capacity, or higher bandwidth compared to macrocells), e.g., low power (LP) RAN node 212.

Any of the RAN nodes 211 and 212 can terminate the air interface protocol and can be the first point of contact for the UEs 201 and 202. In some embodiments, any of the RAN nodes 211 and 212 can fulfill various logical functions for the RAN 210 including, but not limited to, radio network controller (RNC) functions such as radio bearer management, uplink and downlink dynamic radio resource management and data packet scheduling, and mobility management.

In accordance with some embodiments, the UEs 201 and 202 can be configured to communicate using Orthogonal Frequency-Division Multiplexing (OFDM) communication signals with each other or with any of the RAN nodes 211 and 212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 211 and 212 to the UEs 201 and 202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 201 and 202. The physical downlink control channel (PDCCH) may carry information about the transport format and resource allocations related to the PDSCH channel, among other things. It may also inform the UEs 201 and 202 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 211 and 212 based on channel quality information fed back from any of the UEs 201 and 202. The downlink resource assignment information may be sent on the PDCCH used for (e.g., assigned to) each of the UEs 201 and 202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 210 is shown to be communicatively coupled to a core network (CN) 220—via an S1 interface 213. In embodiments, the CN 220 may be an evolved packet core (EPC) network, a NextGen Packet Core (NPC) network, or some other type of CN. In this embodiment the S1 interface 213 is split into two parts: the S1-U interface 214, which carries traffic data between the RAN nodes 211 and 212 and the serving gateway (S-GW) 222, and the S1-mobility management entity (MME) interface 215, which is a signaling interface between the RAN nodes 211 and 212 and MMEs 221.

In this embodiment, the CN 220 comprises the MMEs 221, the S-GW 222, the Packet Data Network (PDN) Gateway (P-GW) 223, and a home subscriber server (HSS) 224. The MMEs 221 may be similar in function to the control plane of legacy Serving General Packet Radio Service (GPRS) Support Nodes (SGSN). The MMEs 221 may manage mobility aspects in access such as gateway selection and tracking area list management. The HSS 224 may comprise a database for network users, including subscription-related information to support the network entities' handling of communication sessions. The CN 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc.

The S-GW 222 may terminate the S1 interface 213 towards the RAN 210, and routes data packets between the RAN 210 and the CN 220. In addition, the S-GW 222 may be a local mobility anchor point for inter-RAN node handovers and also may provide an anchor for inter-3GPP mobility. Other responsibilities may include lawful intercept, charging, and some policy enforcement.

The P-GW 223 may terminate an SGi interface toward a PDN. The P-GW 223 may route data packets between the EPC network 223 and external networks such as a network including the application server 230 (alternatively referred to as application function (AF)) via an Internet Protocol (IP) interface 225. Generally, the application server 230 may be an element offering applications that use IP bearer resources with the core network (e.g., UMTS Packet Services (PS) domain, LTE PS data services, etc.). In this embodiment, the P-GW 223 is shown to be communicatively coupled to an application server 230 via an IP communications interface 225. The application server 230 can also be configured to support one or more communication services (e.g., Voice-over-Internet Protocol (VoIP) sessions, PTT sessions, group communication sessions, social networking services, etc.) for the UEs 201 and 202 via the CN 220.

The P-GW 223 may further be a node for policy enforcement and charging data collection. Policy and Charging Enforcement Function (PCRF) 226 is the policy and charging control element of the CN 220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate Quality of Service (QoS) and charging parameters. The PCRF 226 may provision this rule into a Policy and Charging Enforcement Function (PCEF) (not shown) with the appropriate traffic flow template (TFT) and QoS class of identifier (QCI), which commences the QoS and charging as specified by the application server 230.

Figure 3:
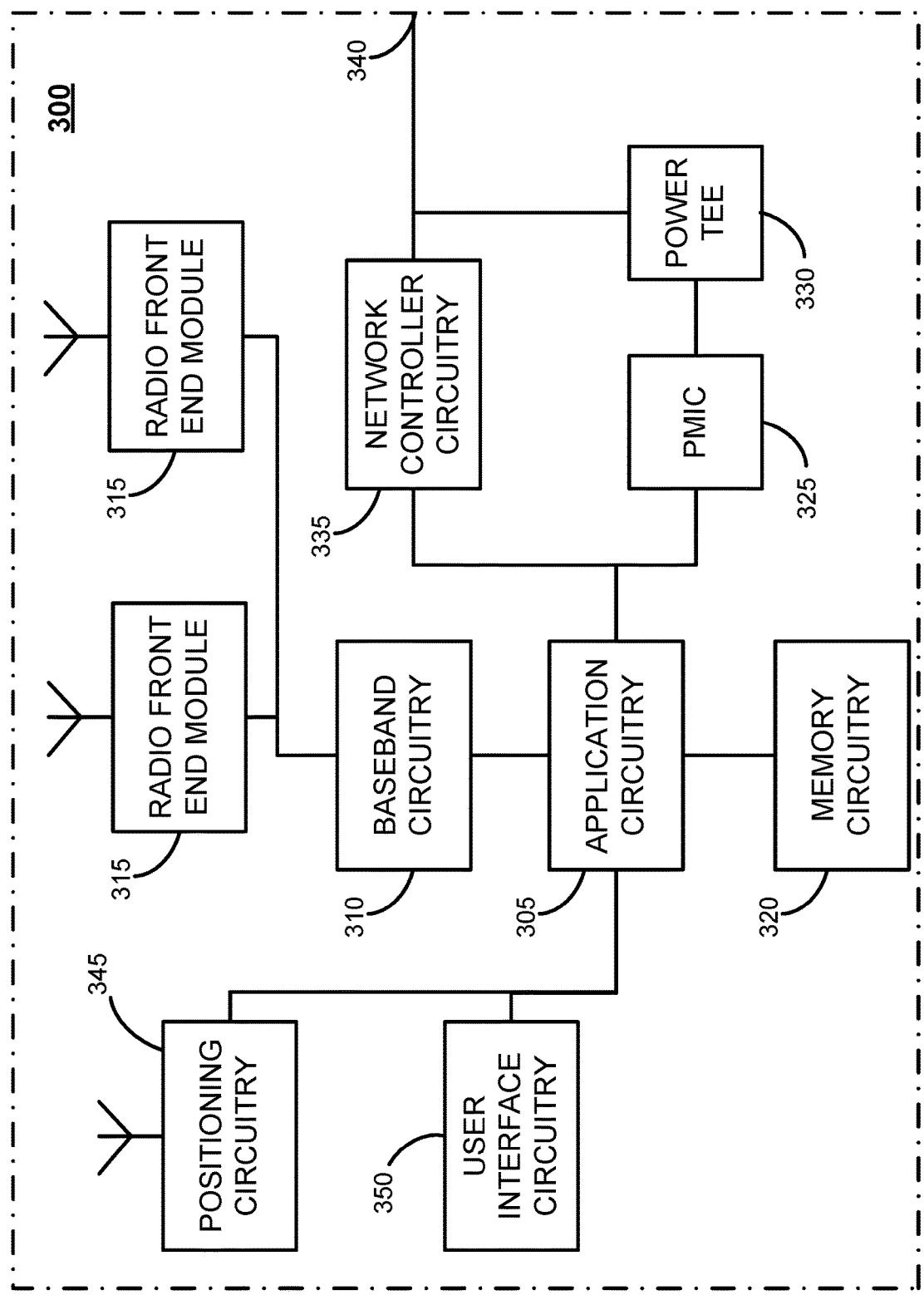
FIG. 3 depicts an example of infrastructure equipment in accordance with some embodiments.

FIG. 3 illustrates an example of infrastructure equipment 300 in accordance with various embodiments. The infrastructure equipment 300 (or "system 300") may be implemented as a base station, radio head, RAN node, etc., such as the RAN nodes 211 and 212, and/or AP 206 shown and described previously. In other examples, the system 300 could be implemented in or by a UE, application server(s) 230, and/or any other element/device discussed herein. The system 300 may include one or more of application circuitry 305, baseband circuitry 310, one or more radio front end modules 315, memory 320, power management integrated circuitry (PMIC) 325, power tee circuitry 330, network controller 335, network interface connector 340, satellite positioning circuitry 345, and user interface 350. In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 220 may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 305 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or TO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 305 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 300 may not utilize application circuitry 305, and instead may include a special-purpose processor/controller to process IP data received from an EPC or 5GC, for example.

Additionally or alternatively, application circuitry 305 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 305 may comprise logic blocks or logic fabric including and other interconnected resources that may be programmed to perform various functions, such as the procedures, methods, functions, etc. of the various embodiments discussed herein. In such embodiments, the circuitry of application circuitry 305 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 310 may be implemented, for example, as a solder-down substrate including one or more integrated circuits, a single packaged integrated circuit soldered to a main circuit board or a multi-chip module containing two or more integrated circuits. Although not shown, baseband circuitry 310 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 310 may include protocol processing circuitry with one or more instances of control circuitry (not shown) to provide control functions for the digital baseband circuitry and/or radio frequency circuitry (for example, the radio front end modules 315).

User interface circuitry 350 may include one or more user interfaces designed to enable user interaction with the system 300 or peripheral component interfaces designed to enable peripheral component interaction with the system 300. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 315 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 315. The RFEMs 315 may incorporate both millimeter wave antennas and sub-millimeter wave antennas.

The memory circuitry 320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 320 may be implemented as one or more of solder down packaged integrated circuits, socketed memory modules and plug-in memory cards.

The PMIC 325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 300 using a single cable.

The network controller circuitry 335 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 300 via network interface connector 340 using a physical connection, which may be electrical (commonly referred to as a "copper interconnect"), optical, or wireless. The network controller circuitry 335 may include one or more dedicated processors and/or FPGAs to communicate using one or more of the aforementioned protocol. In some implementations, the network controller circuitry 335 may include multiple controllers to provide connectivity to other networks using the same or different protocols.

The positioning circuitry 345, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 345 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation (s) ("GNSS nodes") may provide positioning services by continuously transmitting or broadcasting GNSS signals along a line of sight, which may be used by GNSS receivers (e.g., positioning circuitry 345 and/or positioning circuitry implemented by UEs 201, 202, or the like) to determine their GNSS position. The GNSS signals may include a pseudo-random code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 345 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 345 may provide data to application circuitry 305 which may include one or more of position data or time data. Application circuitry 305 may use the time data to synchronize operations with other radio base stations (e.g., RAN nodes 211, 212, or the like).

The components shown by FIG. 3 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 4:
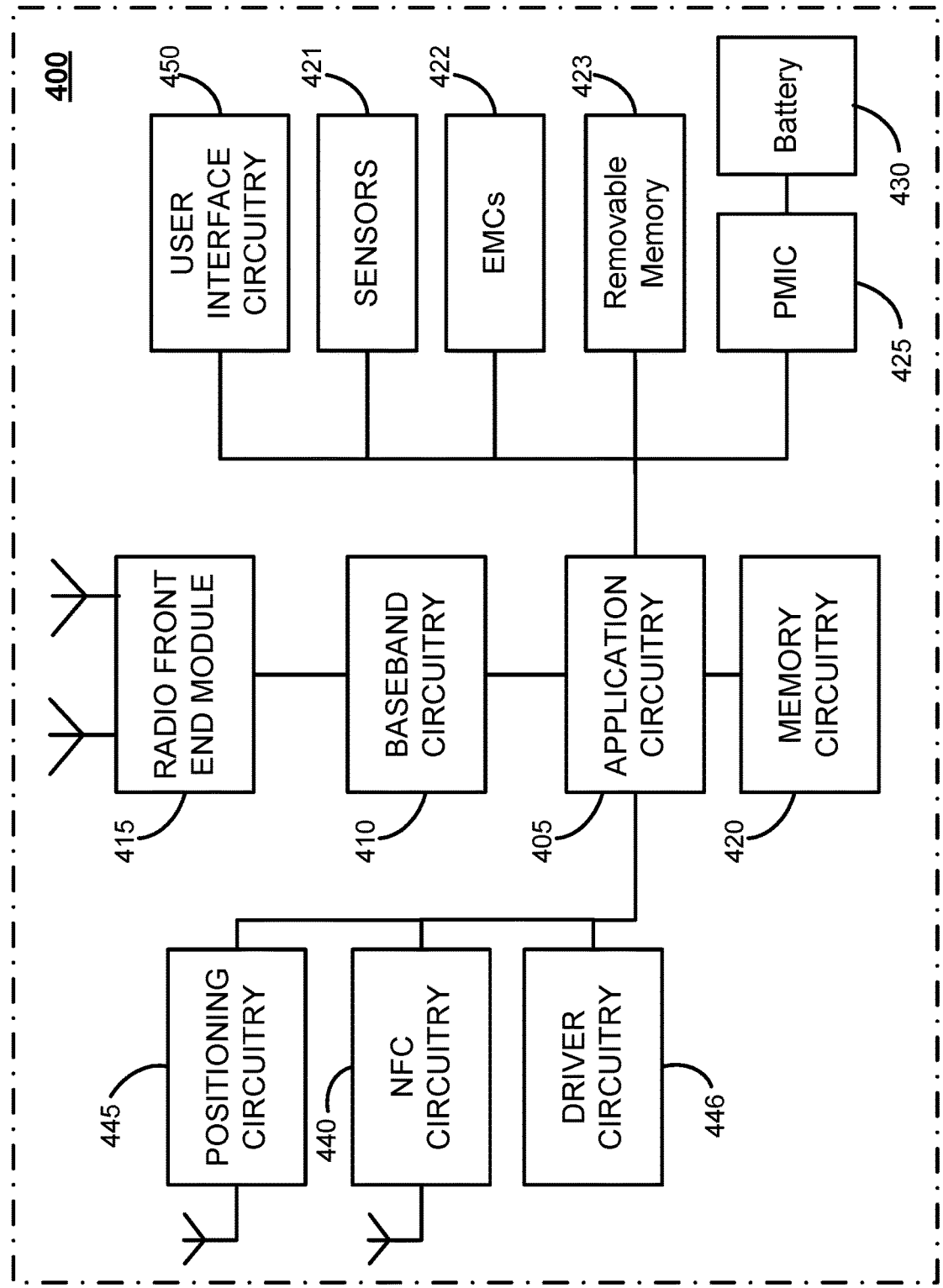
FIG. 4 depicts example components of a computer platform in accordance with some embodiments

FIG. 4 illustrates an example of a platform 400 (or "device 400") in accordance with various embodiments. In embodiments, the computer platform 400 may be suitable for use as UEs 201, 202, application servers 230, and/or any other element/device discussed herein. The platform 400 may include any combinations of the components shown in the example. The components of platform 400 may be implemented as integrated circuits (ICs), portions thereof, discrete electronic devices, or other modules, logic, hardware, software, firmware, or a combination thereof adapted in the computer platform 400, or as components otherwise incorporated within a chassis of a larger system. The block diagram of FIG. 4 is intended to show a high level view of components of the computer platform 400. However, some of the components shown may be omitted, additional components may be present, and different arrangement of the components shown may occur in other implementations.

The application circuitry 405 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (TO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 400. In some embodiments, processors of application circuitry 305/405 may process IP data packets received from an EPC or 5GC.

Application circuitry 405 be or include a microprocessor, a multi-core processor, a multithreaded processor, an ultra-low voltage processor, an embedded processor, or other known processing element. In one example, the application circuitry 405 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 405 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 405 may be a part of a system on a chip (SoC) in which the application circuitry 405 and other components are formed into a single integrated circuit, or a single package, such as the Edison™ or Galileo™ SoC boards from Intel® Corporation.

Additionally or alternatively, application circuitry 405 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 405 may comprise logic blocks or logic fabric including and other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. Although not shown, baseband circuitry 410 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 410 may include protocol processing circuitry with one or more instances of control circuitry (not shown) to provide control functions for the digital baseband circuitry and/or radio frequency circuitry (for example, the radio front end modules 415).

The radio front end modules (RFEMs) 415 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 415. The RFEMs 415 may incorporate both millimeter wave antennas and sub-millimeter wave antennas.

The memory circuitry 420 may include any number and type of memory devices used to provide for a given amount of system memory. As examples, the memory circuitry 420 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 420 may be developed in accordance with a Joint Electron Devices Engineering Council (JEDEC) low power double data rate (LPDDR)-based design, such as LPDDR2, LPDDR3, LPDDR4, or the like. Memory circuitry 320 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 420 may be on-die memory or registers associated with the application circuitry 405. To provide for persistent storage of information such as data, applications, operating systems and so forth, memory circuitry 420 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 400 may incorporate the three-dimensional (3D) cross-point (XPOINT) memories from Intel® and Micron®.

Removable memory circuitry 423 may include devices, circuitry, enclosures/housings, ports or receptacles, etc. used to coupled portable data storage devices with the platform 400. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 400 may also include interface circuitry (not shown) that is used to connect external devices with the platform 400. The external devices connected to the platform 400 via the interface circuitry may include sensors 421, such as accelerometers, level sensors, flow sensors, temperature sensors, pressure sensors, barometric pressure sensors, and the like. The interface circuitry may be used to connect the platform 400 to electro-mechanical components (EMCs) 422, which may allow platform 400 to change its state, position, and/or orientation, or move or control a mechanism or system. The EMCs 422 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 400 may be configured to operate one or more EMCs 422 based on one or more captured events and/or instructions or control signals received from a service provider and/or various clients.

In some implementations, the interface circuitry may connect the platform 400 with positioning circuitry 445, which may be the same or similar as the positioning circuitry 445 discussed with regard to FIG. 3.

In some implementations, the interface circuitry may connect the platform 400 with near-field communication (NFC) circuitry 440, which may include an NFC controller coupled with an antenna element and a processing device. The NFC circuitry 440 may be configured to read electronic tags and/or connect with another NFC-enabled device.

The driver circuitry 446 may include software and hardware elements that operate to control particular devices that are embedded in the platform 400, attached to the platform 400, or otherwise communicatively coupled with the platform 400. The driver circuitry 446 may include individual drivers allowing other components of the platform 400 to interact or control various input/output (I/O) devices that may be present within, or connected to, the platform 400. For example, driver circuitry 446 may include a display driver to control and allow access to a display device, a touchscreen driver to control and allow access to a touchscreen interface of the platform 400, sensor drivers to obtain sensor readings of sensors 421 and control and allow access to sensors 421, EMC drivers to obtain actuator positions of the EMCs 422 and/or control and allow access to the EMCs 422, a camera driver to control and allow access to an embedded image capture device, audio drivers to control and allow access to one or more audio devices.

The power management integrated circuitry (PMIC) 425 (also referred to as "power management circuitry 425") may manage power provided to various components of the platform 400. In particular, with respect to the baseband circuitry 410, the PMIC 425 may control power-source selection, voltage scaling, battery charging, or DC-to-DC conversion. The PMIC 425 may often be included when the platform 400 is capable of being powered by a battery 430, for example, when the device is included in a UE 201, 202.

In some embodiments, the PMIC 425 may control, or otherwise be part of, various power saving mechanisms of the platform 400. For example, if the platform 400 is in an RRC_Connected state, where it is still connected to the RAN node as it expects to receive traffic shortly, then it may enter a state known as Discontinuous Reception Mode (DRX) after a period of inactivity. During this state, the platform 400 may power down for brief intervals of time and thus save power. If there is no data traffic activity for an extended period of time, then the platform 400 may transition off to an RRC_Idle state, where it disconnects from the network and does not perform operations such as channel quality feedback, handover, etc. The platform 400 goes into a very low power state and it performs paging where again it periodically wakes up to listen to the network and then powers down again. The platform 400 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 430 may power the platform 400, although in some examples the platform 400 may be mounted deployed in a fixed location, and may have a power supply coupled to an electrical grid. The battery 430 may be a lithium ion battery, a metal-air battery, such as a zinc-air battery, an aluminum-air battery, a lithium-air battery, and the like. In some implementations, such as in V2X applications, the battery 430 may be a typical lead-acid automotive battery.

In some implementations, the battery 430 may be a "smart battery," which includes or is coupled with a Battery Management System (BMS) or battery monitoring integrated circuitry. The BMS may be included in the platform 400 to track the state of charge (SoCh) of the battery 430. The BMS may be used to monitor other parameters of the battery 430 to provide failure predictions, such as the state of health (SoH) and the state of function (SoF) of the battery 430. The BMS may communicate the information of the battery 430 to the application circuitry 405 or other components of the platform 400. The BMS may also include an analog-to-digital (ADC) convertor that allows the application circuitry 405 to directly monitor the voltage of the battery 430 or the current flow from the battery 430. The battery parameters may be used to determine actions that the platform 400 may perform, such as transmission frequency, network operation, sensing frequency, and the like.

A power block, or other power supply coupled to an electrical grid may be coupled with the BMS to charge the battery 430. In some examples, the power block 228 may be replaced with a wireless power receiver to obtain the power wirelessly, for example, through a loop antenna in the computer platform 400. In these examples, a wireless battery charging circuit may be included in the BMS. The specific charging circuits chosen may depend on the size of the battery 430, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 400 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I2C interface, an SPI interface, point to point interfaces, and a power bus, among others.

Figure 5:
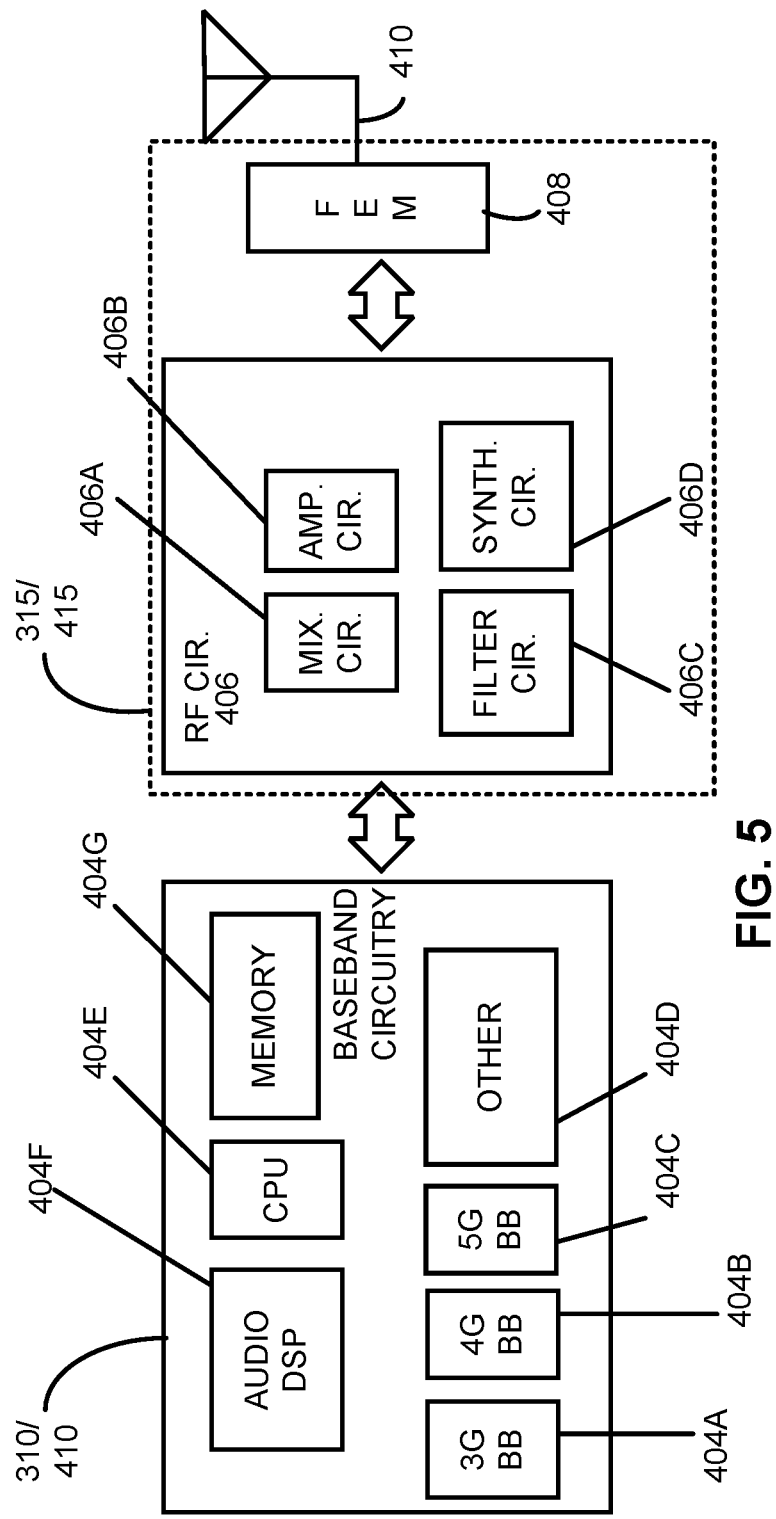
FIG. 5 depicts example components of baseband circuitry and radio frequency circuitry in accordance with some embodiments.

FIG. 5 illustrates example components of baseband circuitry 310/410 and radio front end modules (RFEM) 315/415 in accordance with some embodiments. As shown, the RFEM 315/415 may include Radio Frequency (RF) circuitry 406, front-end module (FEM) circuitry 408, one or more antennas 410 coupled together at least as shown.

The baseband circuitry 310/410 may include circuitry such as, but not limited to, one or more single-core or multi-core processors. The baseband circuitry 310/410 may include one or more baseband processors or control logic to process baseband signals received from a receive signal path of the RF circuitry 406 and to generate baseband signals for a transmit signal path of the RF circuitry 406. Baseband processing circuitry 310/410 may interface with the application circuitry 305/405 for generation and processing of the baseband signals and for controlling operations of the RF circuitry 406. For example, in some embodiments, the baseband circuitry 310/410 may include a third generation (3G) baseband processor 404A, a fourth generation (4G) baseband processor 404B, a fifth generation (5G) baseband processor 404C, or other baseband processor(s) 404D for other existing generations, generations in development or to be developed in the future (e.g., second generation (2G), sixth generation (6G), etc.). The baseband circuitry 310/410 (e.g., one or more of baseband processors 404A-D) may handle various radio control functions that enable communication with one or more radio networks via the RF circuitry 406. In other embodiments, some or all of the functionality of baseband processors 404A-D may be included in modules stored in the memory 404G and executed via a Central Processing Unit (CPU) 404E. The radio control functions may include, but are not limited to, signal modulation/demodulation, encoding/decoding, radio frequency shifting, etc. In some embodiments, modulation/demodulation circuitry of the baseband circuitry 310/410 may include Fast-Fourier Transform (FFT), precoding, or constellation mapping/demapping functionality. In some embodiments, encoding/decoding circuitry of the baseband circuitry 310/410 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 310/410 may include one or more audio digital signal processor(s) (DSP) 404F. The audio DSP(s) 404F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 310/410 and the application circuitry 305/405 may be implemented together such as, for example, on a system on a chip (SOC).

In some embodiments, the baseband circuitry 310/410 may provide for communication compatible with one or more radio technologies. For example, in some embodiments, the baseband circuitry 310/410 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 310/410 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 310/410. RF circuitry 406 may also include a transmit signal path which may include circuitry to up-convert baseband signals provided by the baseband circuitry 310/410 and provide RF output signals to the FEM circuitry 408 for transmission.

In some embodiments, the receive signal path of the RF circuitry 406 may include mixer circuitry 406a, amplifier circuitry 406b and filter circuitry 406c. In some embodiments, the transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 310/410 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect.

In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 310/410 and may be filtered by filter circuitry 406c.

In some embodiments, the mixer circuitry 406a of the receive signal path and the mixer circuitry 406a of the transmit signal path may include two or more mixers and may be arranged for quadrature downconversion and upconversion, respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 310/410 may include a digital baseband interface to communicate with the RF circuitry 406.

In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider.

The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer.

In some embodiments, frequency input may be provided by a voltage controlled oscillator (VCO), although that is not a requirement. Divider control input may be provided by either the baseband circuitry 310/410 or the applications processor 305/405 depending on the desired output frequency. In some embodiments, a divider control input (e.g., N) may be determined from a look-up table based on a channel indicated by the applications processor 305/405.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410. In various embodiments, the amplification through the transmit or receive signal paths may be done solely in the RF circuitry 406, solely in the FEM 408, or in both the RF circuitry 406 and the FEM 408.

In some embodiments, the FEM circuitry 408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410).

Processors of the application circuitry 305/405 and processors of the baseband circuitry 310/410 may be used to execute elements of one or more instances of a protocol stack. For example, processors of the baseband circuitry 310/410, alone or in combination, may be used execute Layer 3, Layer 2, or Layer 1 functionality, while processors of the baseband circuitry 310/410 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
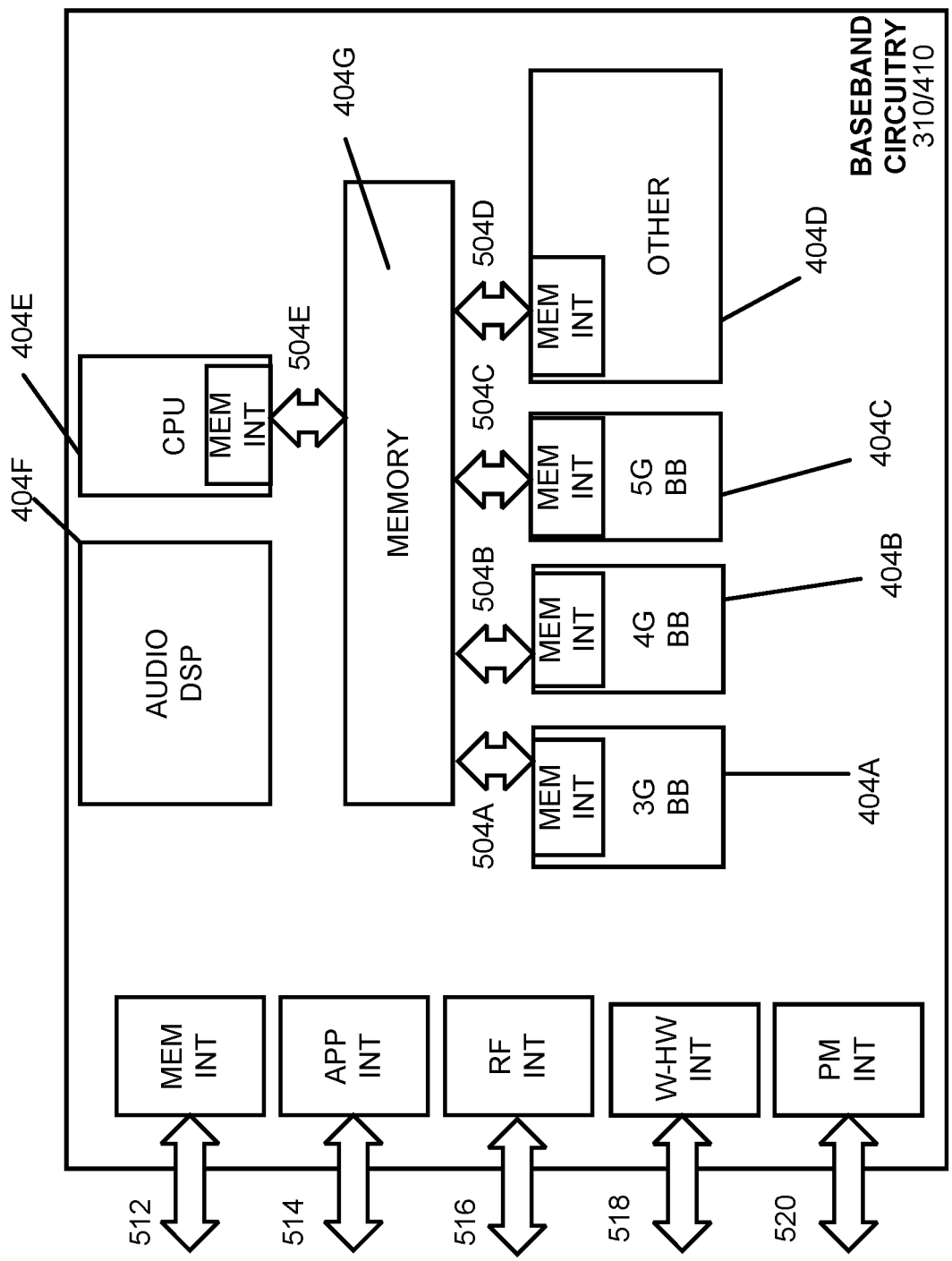
FIG. 6 depicts example interfaces of baseband circuitry in accordance with some embodiments.

FIG. 6 illustrates example interfaces of baseband circuitry in accordance with some embodiments. As discussed above, the baseband circuitry 310/410 of FIGS. 3-4 may comprise processors 404A-404E and a memory 404G utilized by said processors. Each of the processors 404A-404E may include a memory interface, 504A-504E, respectively, to send/receive data to/from the memory 404G.

The baseband circuitry 310/410 may further include one or more interfaces to communicatively couple to other circuitries/devices, such as a memory interface 512 (e.g., an interface to send/receive data to/from memory external to the baseband circuitry 310/410), an application circuitry interface 514 (e.g., an interface to send/receive data to/from the application circuitry 305/405 of FIGS. 3-4), an RF circuitry interface 516 (e.g., an interface to send/receive data to/from RF circuitry 406 of FIG. 5), a wireless hardware connectivity interface 518 (e.g., an interface to send/receive data to/from Near Field Communication (NFC) components, Bluetooth® components (e.g., Bluetooth® Low Energy), Wi-Fi® components, and other communication components), and a power management interface 520 (e.g., an interface to send/receive power or control signals to/from the PMIC 425.

Figure 7:
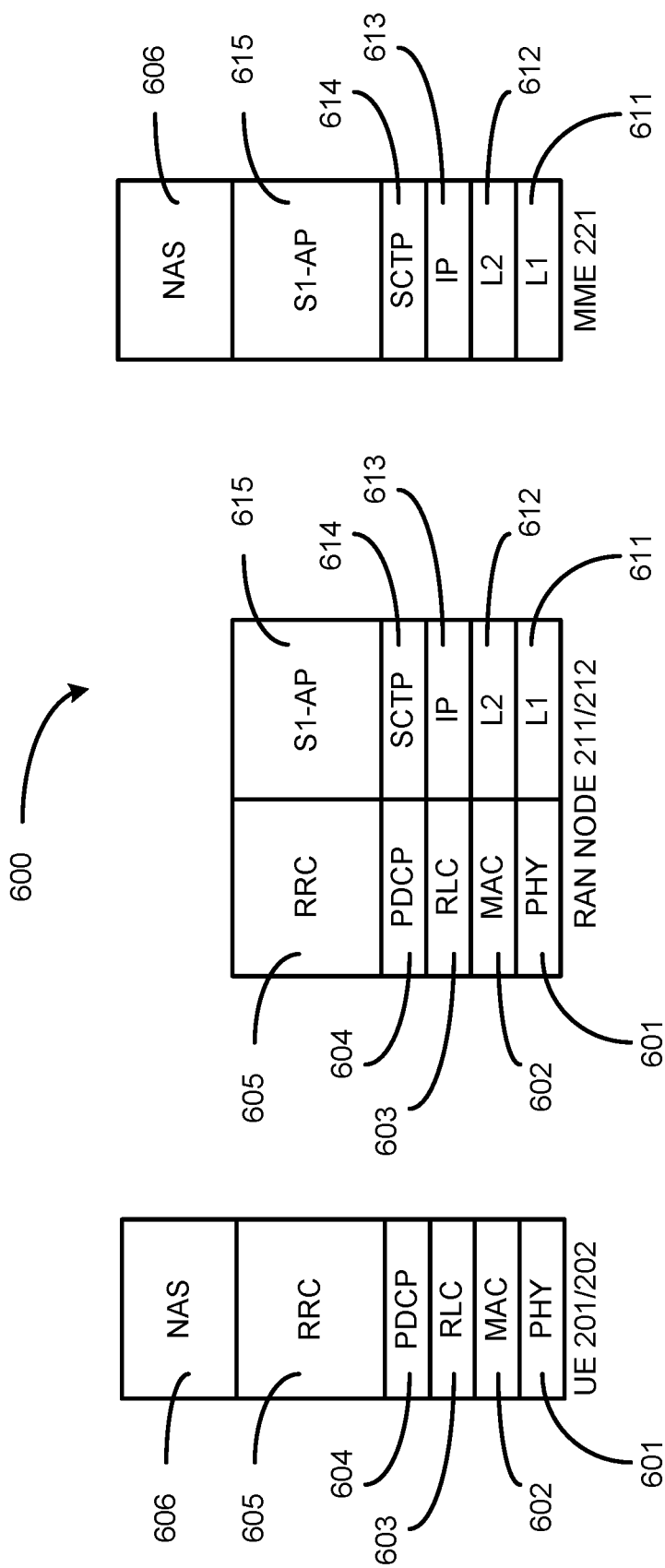
FIG. 7 is an illustration of a control plane protocol stack in accordance with some embodiments.

FIG. 7 is an illustration of a control plane protocol stack in accordance with some embodiments. In this embodiment, a control plane 600 is shown as a communications protocol stack between the UE 201 (or alternatively, the UE 202), the RAN node 211 (or alternatively, the RAN node 212), and the MME 221.

The PHY layer 601 may transmit or receive information used by the MAC layer 602 over one or more air interfaces. The PHY layer 601 may further perform link adaptation or adaptive modulation and coding (AMC), power control, cell search (e.g., for initial synchronization and handover purposes), and other measurements used by higher layers, such as the RRC layer 605. The PHY layer 601 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 602 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

In some embodiments, the PHY layer 601 and/or the MAC layer 602 may perform some or all actions related to handling expiration of the PUSCH validity timer duration and/or failure to receive the PUSCH trigger B. In some embodiments, the PHY layer 601 may monitor for PUSCH trigger B for a PUSCH transmission and/or the MAC layer 602 may consider the PUSCH transmission to have been performed, even if the PUSCH trigger B has not been received and/or the PUSCH validity timer duration has expired. In some embodiments, the MAC layer 602 may start one or more DRX timers and/or may monitor a PDCCH for the PUSCH trigger B until the PUSCH validity timer expires.

The RLC layer 603 may operate in a plurality of modes of operation, including: Transparent Mode (TM), Unacknowledged Mode (UM), and Acknowledged Mode (AM). The RLC layer 603 may execute transfer of upper layer protocol data units (PDUs), error correction through automatic repeat request (ARQ) for AM data transfers, and concatenation, segmentation and reassembly of RLC SDUs for UM and AM data transfers. The RLC layer 603 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 604 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 605 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 201 and the RAN node 211 may utilize a Uu interface (e.g., an LTE-Uu interface) to exchange control plane data via a protocol stack comprising the PHY layer 601, the MAC layer 602, the RLC layer 603, the PDCP layer 604, and the RRC layer 605.

The non-access stratum (NAS) protocols 606 form the highest stratum of the control plane between the UE 201 and the MME 221. The NAS protocols 606 support the mobility of the UE 201 and the session management procedures to establish and maintain IP connectivity between the UE 201 and the P-GW 223.

The S1 Application Protocol (S1-AP) layer 615 may support the functions of the S1 interface and comprise Elementary Procedures (EPs). An EP is a unit of interaction between the RAN node 211 and the CN 220. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 614 may ensure reliable delivery of signaling messages between the RAN node 211 and the MME 221 based, in part, on the IP protocol, supported by the IP layer 613. The L2 layer 612 and the L1 layer 611 may refer to communication links (e.g., wired or wireless) used by the RAN node and the MME to exchange information.

The RAN node 211 and the MME 221 may utilize an S1-MME interface to exchange control plane data via a protocol stack comprising the L1 layer 611, the L2 layer 612, the IP layer 613, the SCTP layer 614, and the S1-AP layer 615.

Figure 8:
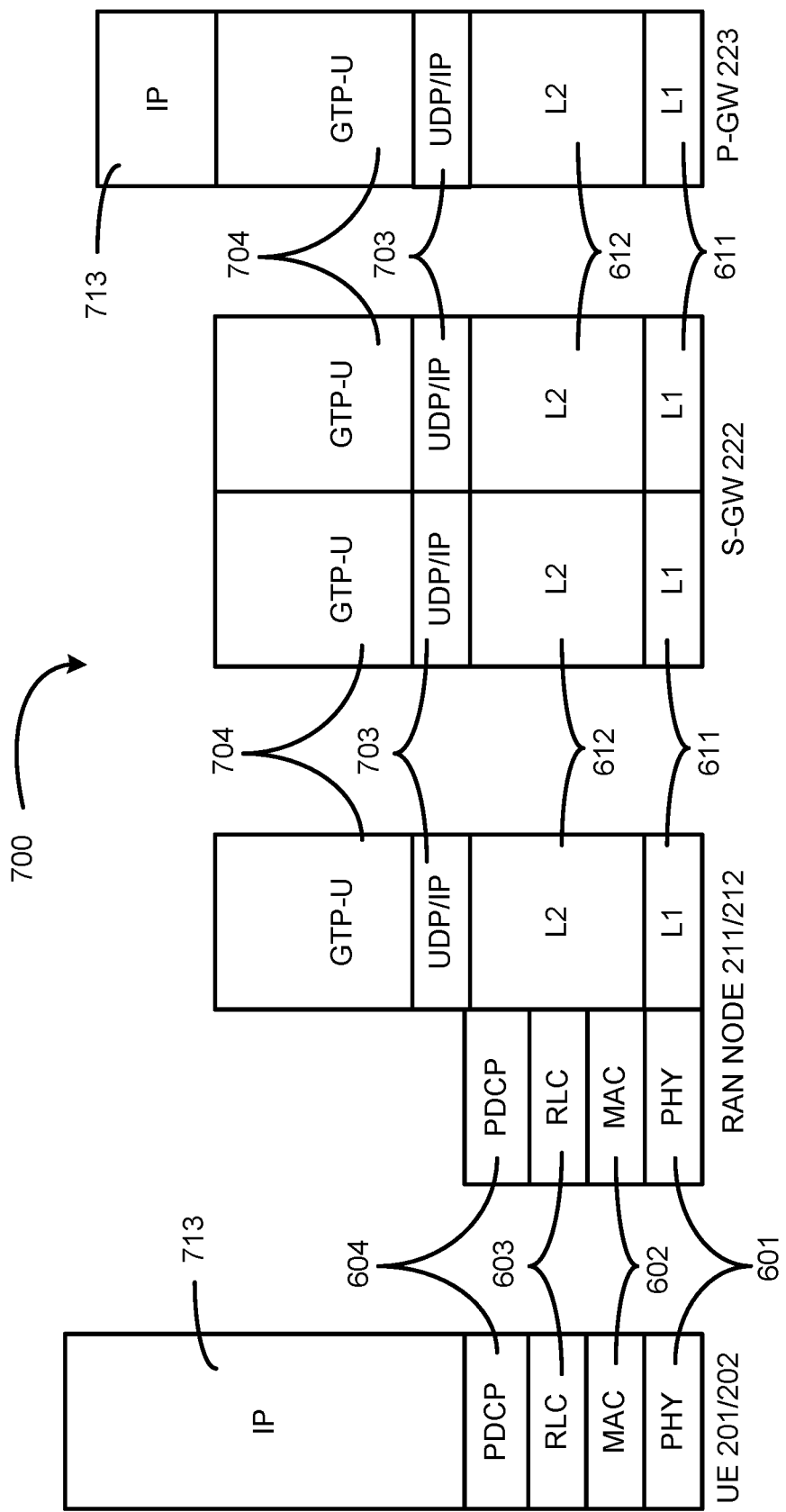
FIG. 8 is an illustration of a user plane protocol stack in accordance with some embodiments.

FIG. 8 is an illustration of a user plane protocol stack in accordance with some embodiments. In this embodiment, a user plane 700 is shown as a communications protocol stack between the UE 201 (or alternatively, the UE 202), the RAN node 211 (or alternatively, the RAN node 212), the S-GW 222, and the P-GW 223. The user plane 700 may utilize at least some of the same protocol layers as the control plane 600. For example, the UE 201 and the RAN node 211 may utilize a Uu interface (e.g., an LTE-Uu interface) to exchange user plane data via a protocol stack comprising the PHY layer 601, the MAC layer 602, the RLC layer 603, the PDCP layer 604.

The General Packet Radio Service (GPRS) Tunneling Protocol for the user plane (GTP-U) layer 704 may be used for carrying user data within the GPRS core network and between the radio access network and the core network. The user data transported can be packets in any of IPv4, IPv6, or PPP formats, for example. The UDP and IP security (UDP/IP) layer 703 may provide checksums for data integrity, port numbers for addressing different functions at the source and destination, and encryption and authentication on the selected data flows. The RAN node 211 and the S-GW 222 may utilize an S1-U interface to exchange user plane data via a protocol stack comprising the L1 layer 611, the L2 layer 612, the UDP/IP layer 703, and the GTP-U layer 704. The S-GW 222 and the P-GW 223 may utilize an S5/S8a interface to exchange user plane data via a protocol stack comprising the L1 layer 611, the L2 layer 612, the UDP/IP layer 703, and the GTP-U layer 704. As discussed above with respect to FIG. 7, NAS protocols support the mobility of the UE 201 and the session management procedures to establish and maintain IP connectivity between the UE 201 and the P-GW 223.

Figure 9:
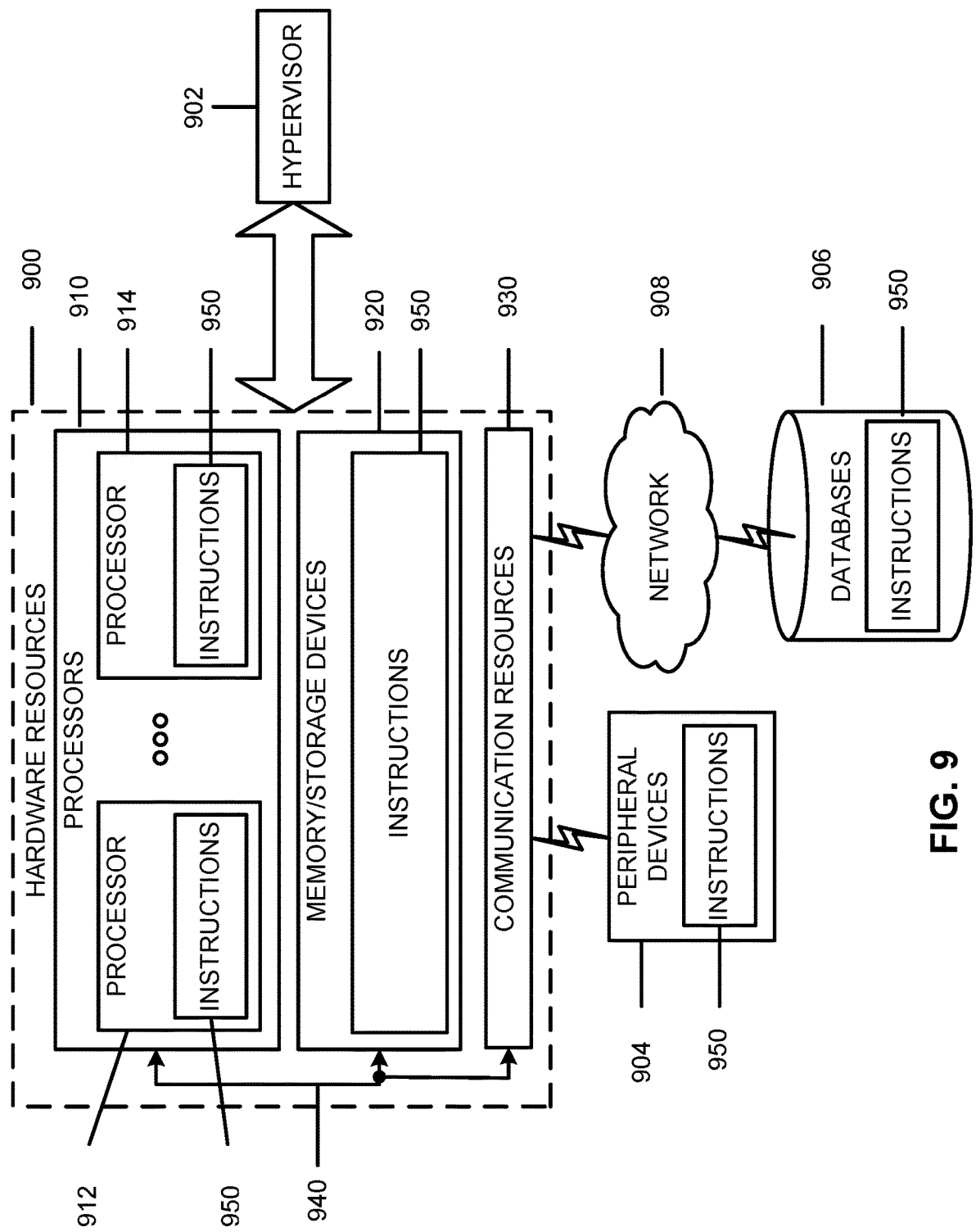
FIG. 9 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 902 may be executed to provide an execution environment for one or more network slices/sub-slices to utilize the hardware resources 900. A "virtualized resource" may refer to compute, storage, and/or network resources provided by virtualization infrastructure to an application, device, system, etc.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914.

The memory/storage devices 920 may include main memory, disk storage, or any suitable combination thereof. The memory/storage devices 920 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

In some embodiments, one of more components of FIGS. 2, 3, 4, 5, 6, 7, 8, and/or 9, and particularly the baseband circuitry of FIG. 6 (e.g., one or more of CPU 404E, 5G baseband processor 404C, and 4G baseband processor 404B), may be to: monitor, at a physical layer, for a PUSCH trigger for a PUSCH transmission; determine, at the physical layer, the PUSCH trigger is not received, wherein the wireless communication device is not to perform the PUSCH transmission based on the determination that the PUSCH trigger is not received; and consider, at a MAC entity, the PUSCH transmission to have been performed. In embodiments, the PUSCH trigger may be a PUSCH trigger B that may be a one bit trigger in a PDCCH DCI scrambled with a CC-RNTI. In embodiments, the MAC entity may start one or more discontinuous reception (DRX) timers (e.g., an inactivity timer, a retransmission timer, a short cycle timer, and/or any other suitable timer) and may monitor a PDCCH for the PUSCH trigger until the PUSCH validity timer expires.

In some embodiments, one of more components of FIGS. 2, 3, 4, 5, 6, 7, 8, and/or 9, and particularly the baseband circuitry of FIG. 6, may include processing circuitry (e.g., one or more of CPU 404E, 5G baseband processor 404C, and 4G baseband processor 404B) to: monitor, at a physical layer, for a PUSCH trigger for a PUSCH transmission before expiration of a PUSCH validity timer duration; determine, at the physical layer, the PUSCH trigger is not received, wherein a wireless communication apparatus is not to perform the PUSCH transmission based on the determination that the PUSCH trigger is not received; and consider, at a MAC entity, the PUSCH transmission to have been performed; and memory (e.g., memory 504G), coupled with the processing circuitry, to store an indication of the PUSCH validity timer duration. In embodiments, the PUSCH trigger may be a PUSCH trigger B that may be a one bit trigger in a PDCCH DCI scrambled with a CC-RNTI.

In embodiments, an apparatus with one of more components of FIGS. 2, 3, 4, 5, 6, 7, 8, and/or 9 may be to receive a signal, process the signal, determine expiration of a validity duration, and treat the expiration of the validity duration as a HARQ. The apparatus may assume that a previously scheduled PUSCH transmission in a two-stage grant has been transmitted and waits for retransmission. The apparatus may be to monitor for PUSCH trigger B, according to which transmissions are not performed if a validity timer expires. DCI may indicate a two-stage grant, wherein a first two bits of a timing offset field indicates a timing offset between PUSCH trigger B and a PUSCH transmission. A last two bits of a timing offset field indicates two-stage grant validity duration, further comprising wherein if PUSCH trigger B is not received within the validity duration after the PUSCH trigger A is received, then PUSCH trigger A is voided. In another embodiment the apparatus may be to receive a signal, process the signal, and to signal the expiration of a validity duration from PHY to MAC layers. The apparatus may be a UE.

Figure 10:
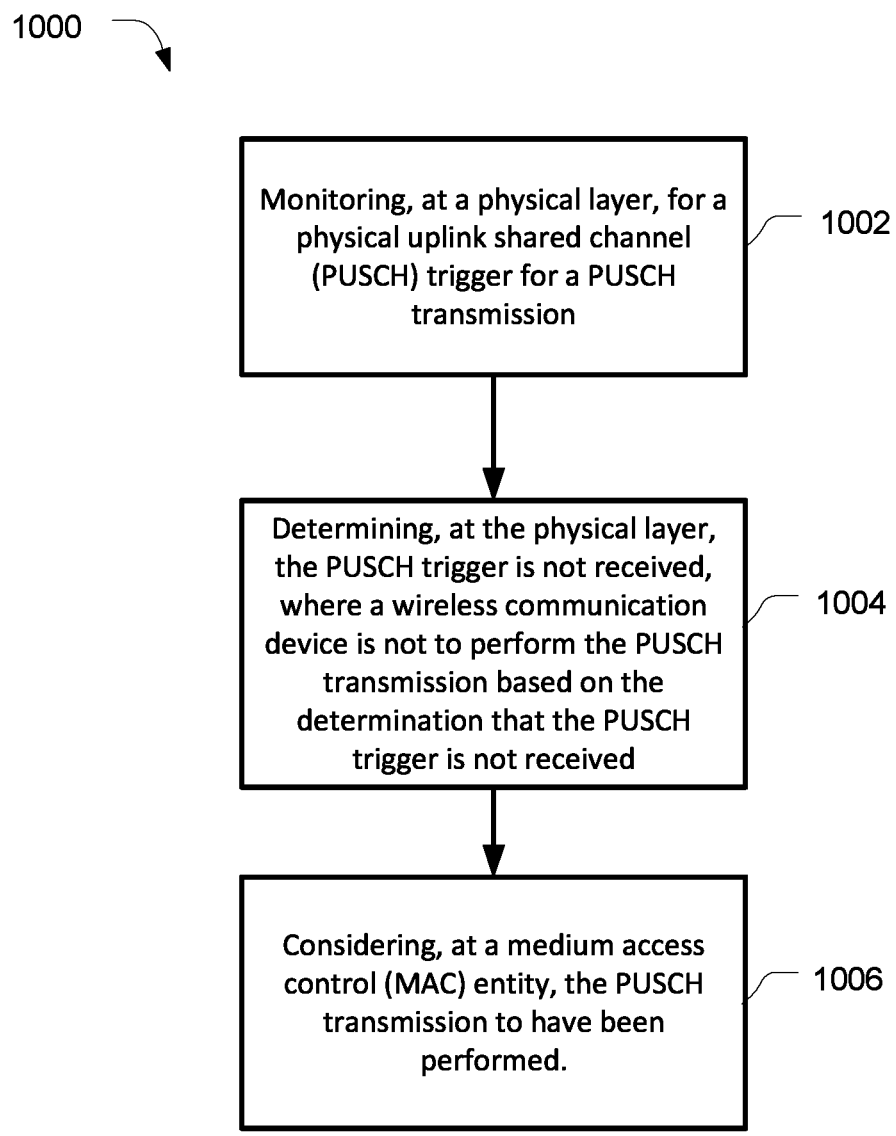
FIG. 10 schematically illustrates a flow diagram for a process of handling a failure to receive a physical uplink shared channel (PUSCH) trigger in accordance with various embodiments.

In some embodiments, the electronic device(s), network(s), system(s), chip(s), and/or component(s) or portions or implementations thereof, of FIGS. 2-9, and/or some other figure herein may be configured to perform one or more processes, techniques, and/or methods as described herein, or portions thereof. One such process is depicted in FIG. 10. For example, a process 1000 may include: monitoring or causing to monitor, at a physical layer, for a physical uplink shared channel (PUSCH) trigger for a PUSCH transmission at a block 1002; determining or causing to determine, at the physical layer, the PUSCH trigger is not received, where a wireless communication device is not to perform the PUSCH transmission based on the determination that the PUSCH trigger is not received at a block 1004; and considering or causing to consider, at a medium access control (MAC) entity, the PUSCH transmission to have been performed at a block 1006. In some embodiments, considering or causing to consider the PUSCH transmission to have been performed at the block 1006 may include starting or causing to start one or more DRX timers as though the PUSCH transmission had been performed.

In some embodiments, one of more components of FIGS. 2, 3, 4, 5, 6, 7, 8, and/or 9 may be configured to perform one or more processes, techniques, and/or methods as described herein, or portions thereof. For example, a process may include receiving a signal, processing the signal, determining expiration of a validity duration, and treating the expiration of the validity duration as a HARQ. An apparatus performing the process may assume that it, a previously scheduled PUSCH transmission in a two-stage grant, has been transmitted and may be waiting for retransmission. An apparatus performing the process may be monitoring for PUSCH trigger B, according to which transmissions are not performed if a validity timer expires. DCI may be indicating a two-stage grant, and an apparatus performing the process may be indicating a timing offset between PUSCH trigger B and a PUSCH transmission with a first two bits of a timing offset field. A last two bits of a timing offset field may be indicating two-stage grant validity duration, further comprising wherein if PUSCH trigger B is not received within the validity duration after the PUSCH trigger A is received, then voiding PUSCH trigger A.

The following paragraphs provide examples of various ones of the embodiments disclosed herein.

EXAMPLES

Example 1 may include at least one computer-readable medium comprising instructions stored thereon that, in response to execution of the instructions by one or more processors cause a wireless communications device to: monitor, at a physical layer, for a physical uplink shared channel (PUSCH) trigger for a PUSCH transmission; determine, at the physical layer, the PUSCH trigger is not received, wherein the wireless communication device is not to perform the PUSCH transmission based on the determination that the PUSCH trigger is not received; and start, at a medium access control (MAC) entity, one or more discontinuous reception (DRX) timers as though the PUSCH transmission had been performed.

Example 2 may include the subject matter of Example 1 or any other example herein, wherein the PUSCH trigger is a PUSCH trigger B.

Example 3 may include the subject matter of Example 2 or any other example herein, wherein the PUSCH trigger B is a one bit trigger in a physical downlink control channel (PDCCH) downlink control information (DCI) scrambled with a common control radio network temporary identifier (CC-RNTI).

Example 4 may include the subject matter of Example 1 or any other example herein, wherein the instructions are further to cause the wireless communications device to: identify a PUSCH validity timer duration; determine whether the PUSCH trigger is received before an expiration of the PUSCH validity timer duration; and perform the PUSCH transmission in response to the PUSCH trigger is received before the expiration of the PUSCH validity timer duration.

Example 5 may include the subject matter of Example 4 or any other example herein, wherein the instructions are further to cause the MAC entity to monitor a physical downlink control channel (PDCCH) for the PUSCH trigger until the PUSCH validity timer expires.

Example 6 may include the subject matter of Example 4 or any other example herein, wherein the instructions are to cause the wireless communications device to identify the PUSCH validity timer duration in a downlink control information (DCI) transmission.

Example 7 may include the subject matter of Example 1 or any other example herein, wherein the instructions are to cause the wireless communications device to wait for retransmission at the MAC entity.

Example 8 may include the subject matter of any one of Examples 1-7 or any other example herein, wherein the wireless communications device is a user equipment (UE) or a portion thereof.

Example 9 may include a wireless communication apparatus comprising: processing circuitry to: monitor, at a physical layer, for a physical uplink shared channel (PUSCH) trigger for a PUSCH transmission before expiration of a PUSCH validity timer duration; determine, at the physical layer, the PUSCH trigger is not received, wherein the wireless communication apparatus is not to perform the PUSCH transmission based on the determination that the PUSCH trigger is not received; and consider, at a medium access control (MAC) entity, the PUSCH transmission to have been performed; and memory, coupled with the processing circuitry, to store an indication of the PUSCH validity timer duration.

Example 10 may include the subject matter of Example 9 or any other example herein, wherein the processing circuitry is also to identify the PUSCH validity timer duration in a downlink control information (DCI) transmission.

Example 11 may include the subject matter of Example 9 or any other example herein, wherein the PUSCH trigger is a PUSCH trigger B.

Example 12 may include the subject matter of Example 9 or any other example herein, wherein the PUSCH trigger B is a one bit trigger in a physical downlink control channel (PDCCH) downlink control information (DCI) scrambled with a common control radio network temporary identifier (CC-RNTI).

Example 13 may include the subject matter of Example 9 or any other example herein, wherein the processing circuitry is to transmit the PUSCH transmission in response to the PUSCH trigger is received before the expiration of the PUSCH validity timer duration.

Example 14 may include the subject matter of Example 9 or any other example herein, wherein the processing circuitry is also to: start, at the MAC entity, one or more discontinuous reception (DRX) timers; and monitor, at the MAC entity, a physical downlink control channel (PDCCH) for the PUSCH trigger until expiration of the PUSCH validity timer duration.

Example 15 may include the subject matter of Example 9 or any other example herein, wherein the processing circuitry is to signal expiration of the PUSCH validity timer duration from the physical layer to a MAC layer.

Example 16 may include the subject matter of Example 15 or any other example herein, wherein the processing circuitry is to process the PUSCH transmission at the MAC layer based at least in part on the expiration of the PUSCH validity timer duration signaled by the physical layer.

Example 17 may include the subject matter of Example 9-16 or any other example herein, wherein the processing circuitry and the memory are included in a user equipment (UE) or a portion thereof.

Example 18 may include a wireless communication apparatus comprising: means for monitoring for a physical uplink shared channel (PUSCH) trigger for a PUSCH transmission; means for determining the PUSCH trigger is not received, wherein the wireless communication apparatus is not to perform the PUSCH transmission based on the determination that the PUSCH trigger is not received; and means for starting, at a medium access control (MAC) entity, one or more discontinuous reception (DRX) timers as though the PUSCH transmission had been performed.

Example 19 may include the subject matter of Example 18 or any other example herein, wherein the PUSCH trigger is a PUSCH trigger B and the means for monitoring for the PUSCH trigger B includes means for monitoring for the PUSCH trigger B by a physical layer.

Example 20 may include the subject matter of Example 18 or any other example herein, wherein the PUSCH trigger B is a one bit trigger in a physical downlink control channel (PDCCH) downlink control information (DCI) scrambled with a common control radio network temporary identifier (CC-RNTI).

Example 21 may include the subject matter of Example 18 or any other example herein, further comprising: means for identifying a PUSCH validity timer duration; means for determining whether the PUSCH trigger is received before an expiration of the PUSCH validity timer duration; and means for performing the PUSCH transmission in response to the PUSCH trigger is received before the expiration of the PUSCH validity timer duration.

Example 22 may include the subject matter of Example 21 or any other example herein, further comprising means for monitoring, at the MAC entity, a physical downlink control channel (PDCCH) for the PUSCH trigger until expiration of the PUSCH validity timer duration.

Example 23 may include the subject matter of Example 21 or any other example herein, wherein the means for identifying the PUSCH validity timer duration is to identify the PUSCH validity timer duration in a downlink control information (DCI) transmission.

Example 24 may include the subject matter of Example 18 or any other example herein, further comprising means for waiting for retransmission at the MAC entity in response to the PUSCH trigger is not received.

Example 25 may include the subject matter of Example 18-24 or any other example herein, wherein the wireless communication apparatus is a user equipment (UE) or a portion thereof.

Example 26 may include a method of handling a physical uplink shared channel (PUSCH) transmission grant at a wireless communication device, the method comprising: monitoring or causing to monitor, at a physical layer, for a physical uplink shared channel (PUSCH) trigger for a PUSCH transmission; determining or causing to determine, at the physical layer, the PUSCH trigger is not received, wherein the wireless communication device is not to perform the PUSCH transmission based on the determination that the PUSCH trigger is not received; and considering or causing to consider, at a medium access control (MAC) entity, the PUSCH transmission to have been performed.

Example 27 may include the subject matter of Example 26 or any other example herein, wherein the PUSCH trigger is a PUSCH trigger B.

Example 28 may include the subject matter of Example 27 or any other example herein, wherein the PUSCH trigger B is a one bit trigger in a physical downlink control channel (PDCCH) downlink control information (DCI) scrambled with a common control radio network temporary identifier (CC-RNTI).

Example 29 may include the subject matter of Example 26 or any other example herein, wherein the method further includes: identifying or causing to identify a PUSCH validity timer duration; determining or causing to determine whether the PUSCH trigger is received before an expiration of the PUSCH validity timer duration; and performing or causing to perform the PUSCH transmission in response to the PUSCH trigger is received before the expiration of the PUSCH validity timer duration.

Example 30 may include the subject matter of Example 29 or any other example herein, wherein the method further includes starting or causing to start, at the MAC entity, one or more discontinuous reception (DRX) timers and monitoring or causing to monitor a physical downlink control channel (PDCCH) for the PUSCH trigger until the PUSCH validity timer expires.

Example 31 may include the subject matter of Example 29 or any other example herein, wherein the method further includes identifying or causing to identify the PUSCH validity timer duration in a downlink control information (DCI) transmission.

Example 32 may include the subject matter of Example 26 or any other example herein, wherein the method further includes waiting or causing to wait for retransmission at the MAC entity.

Example 33 may include the subject matter of any one of Examples 26-32 or any other example herein, wherein the method is performed by a user equipment (UE) or a portion thereof.

Example 34 may include an apparatus comprising means to receive a signal, means to process the signal, means to determine expiration of a validity duration, and means to treat the expiration of the validity duration as a Hybrid Automatic Repeat reQuest (HARQ).

Example 35 may include the apparatus according to Example 34 or some other example herein, wherein the apparatus assumes that it, a previously scheduled Physical Uplink Shared Channel (PUSCH) transmission in a two-stage grant, has been transmitted and waits for retransmission.

Example 36 may include the apparatus according to one or more of Examples 34-35 or some other example herein, in which the apparatus may comprise means to monitor for PUSCH trigger B, according to which transmissions are not performed if a validity timer expires.

Example 37 may include the apparatus according to one or more of Examples 34-36 or some other example herein, further comprising means for Downlink Control Information (DCI) to indicate a two-stage grant, wherein a first two bits of a timing offset field indicates a timing offset between PUSCH trigger B and a PUSCH transmission.

Example 38 may include the apparatus according to one or more of Examples 34-37 or some other example herein, further comprising means for last two bits of a timing offset field to indicates two-stage grant validity duration, further comprising means wherein if PUSCH trigger B is not received within the validity duration after the PUSCH trigger A is received, then PUSCH trigger A is voided.

Example 39 may include an apparatus comprising means to receive a signal, means to process the signal, and means to signal the expiration of a validity duration from Physical Layer (PHY) to Medium Access Control (MAC) layers.

Example 40 may include the apparatus according to one or more of Examples 34-39 or some other example herein, wherein the apparatus is a User Equipment (UE).

Example 41 may include an apparatus to receive a signal, process the signal, determine expiration of a validity duration, and to treat the expiration of the validity duration as a Hybrid Automatic Repeat reQuest (HARQ).

Example 42 may include the apparatus according to Example 41 or some other example herein, wherein the apparatus assumes that it, a previously scheduled PUSCH transmission in a two-stage grant, has been transmitted and waits for retransmission.

Example 43 may include the apparatus according to one or more of Examples 41-42 or some other example herein, in which the apparatus may be to monitor for PUSCH trigger B, according to which transmissions are not performed if a validity timer expires.

Example 44 may include the apparatus according to one or more of Examples 41-43 or some other example herein, further comprising Downlink Control Information (DCI) to indicate a two-stage grant, wherein a first two bits of a timing offset field indicates a timing offset between PUSCH trigger B and a PUSCH transmission.

Example 45 may include the apparatus according to one or more of Examples 41-44 or some other example herein, further comprising last two bits of a timing offset field indicates two-stage grant validity duration, further comprising wherein if PUSCH trigger B is not received within the validity duration after the PUSCH trigger A is received, then PUSCH trigger A is voided.

Example 46 may include an apparatus to receive a signal, process the signal, and to signal the expiration of a validity duration from Physical Layer (PHY) to Medium Access Control (MAC) layers.

Example 47 may include the apparatus according to one or more of Examples 41-46 or some other example herein, wherein the apparatus is a User Equipment (UE).

Example 48 may include a method comprising receiving a signal, processing the signal, determining expiration of a validity duration, and treating the expiration of the validity duration as a Hybrid Automatic Repeat reQuest (HARQ).

Example 49 may include the method according to Example 48 or some other example herein, wherein an apparatus or module of the apparatus performing the method assumes that a previously scheduled PUSCH transmission in a two-stage grant has been transmitted and waits for retransmission.

Example 50 may include the method according to one or more of Examples 48-49 or some other example herein, further comprising monitoring for Physical Uplink Shared Channel (PUSCH) trigger B, according to which transmissions are not performed if a validity timer expires.

Example 51 may include the method according to one or more of Examples 48-50 or some other example herein, further comprising Downlink Control Information (DCI) indicating a two-stage grant, and indicating a timing offset between PUSCH trigger B and a PUSCH transmission with a first two bits of a timing offset field.

Example 52 may include the method according to one or more of Examples 48-51 or some other example herein, further comprising a last two bits of a timing offset field indicating two-stage grant validity duration, further comprising wherein if PUSCH trigger B is not received within the validity duration after the PUSCH trigger A is received, then voiding PUSCH trigger A.

Example 53 may include a method comprising receiving a signal, processing the signal, and signaling the expiration of a validity duration from Physical Layer (PHY) to Medium Access Control (MAC) layers.

Example 54 may include the method according to one or more of Examples 48-53 or some other example herein, wherein the method is performed by a User Equipment (UE).

Example 55 may include a User Equipment (UE) Medium Access Control (MAC) treating expiration of validity duration as a HARQ retransmission. In other words, the UE MAC assumes that a previously scheduled PUSCH transmission in a two-stage grant has been transmitted and may wait for retransmission.

Example 56 may include a special handling by the MAC layer is done as an aborted transmission by signaling the expiration of the validity duration from PHY to MAC layers.

Example 57 may include an apparatus comprising means to perform one or more elements of a method described in or related to any of examples 1-56, or any other method or process described herein.

Example 58 may include one or more non-transitory computer-readable media comprising instructions to cause an electronic device, upon execution of the instructions by one or more processors of the electronic device, to perform one or more elements of a method described in or related to any of examples 1-56, or any other method or process described herein.

Example 59 may include an apparatus comprising logic, modules, and/or circuitry to perform one or more elements of a method described in or related to any of examples 1-56, or any other method or process described herein.

Example 60 may include a method, technique, or process as described in or related to any of examples 1-56, or portions or parts thereof.

Example 61 may include an apparatus comprising: one or more processors and one or more computer readable media comprising instructions that, when executed by the one or more processors, cause the one or more processors to perform the method, techniques, or process as described in or related to any of examples 1-56, or portions thereof.

Example 62 may include a method of communicating in a wireless network as shown and described herein.

Example 63 may include a system for providing wireless communication as shown and described herein.

Example 64 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. At least one non-transitory computer-readable medium comprising instructions stored thereon that, in response to execution of the instructions by one or more processors cause a user equipment (UE) to:
receive a physical uplink shared channel (PUSCH) trigger A;
monitor, at a physical layer of the wireless communications device, for a PUSCH trigger B for a PUSCH transmission;
determine, at the physical layer, the PUSCH trigger B has not been received prior to expiration of a PUSCH validity timer, wherein the wireless communication device is not to perform the PUSCH transmission based on the determination; and
start, at a medium access control (MAC) entity, one or more discontinuous reception (DRX) timers based on the determination that the PUSCH trigger B has not been received prior to the expiration of the PUSCH validity timer.

2. The at least one non-transitory computer-readable medium of claim 1, wherein the PUSCH trigger B is a one bit trigger in a physical downlink control channel (PDCCH) downlink control information (DCI) scrambled with a common control radio network temporary identifier (CC-RNTI).

3. The at least one non-transitory computer-readable medium of claim 1, wherein the instructions, in response to execution, are further to cause the MAC entity to monitor a physical downlink control channel (PDCCH) for the PUSCH trigger B until the PUSCH validity timer expires.

4. The at least one non-transitory computer-readable medium of claim 1, wherein the instructions, in response to execution, are to cause the UE to identify a duration of the PUSCH validity timer in a downlink control information (DCI) transmission.

5. The at least one non-transitory computer-readable medium of claim 1, wherein the instructions are to cause the UE to wait for retransmission of the PUSCH transmission at the MAC entity.

6. A wireless communication apparatus comprising: processing circuitry to:
obtain a physical uplink shared channel (PUSCH) trigger A;
monitor, at a physical layer, of the wireless communications apparatus, for a PUSCH trigger B for a PUSCH transmission before expiration of a PUSCH validity timer;
determine, at the physical layer, the PUSCH trigger B has not been received, wherein the wireless communication apparatus is not to perform the PUSCH transmission based on the determination that the PUSCH trigger B has not been received; and
consider, at a medium access control (MAC) entity, the PUSCH transmission to have been performed; and
memory, coupled with the processing circuitry, to store an indication of a duration of the PUSCH validity timer.

7. The wireless communication apparatus of claim 6, wherein the processing circuitry is also to identify the duration of the PUSCH validity timer in a downlink control information (DCI) transmission.

8. The wireless communication apparatus of claim 6, wherein the PUSCH trigger B is a one bit trigger in a physical downlink control channel (PDCCH) downlink control information (DCI) scrambled with a common control radio network temporary identifier (CC-RNTI).

9. The wireless communication apparatus of claim 6, wherein the processing circuitry is also to start, at the MAC entity, one or more discontinuous reception (DRX) timers upon an expiration of the PUSCH validity timer.

10. The wireless communication apparatus of claim 6, wherein the processing circuitry is also to: monitor, at the MAC entity, a physical downlink control channel (PDCCH) for the PUSCH trigger B until expiration of the PUSCH validity timer.

11. The wireless communication apparatus of claim 6, wherein the processing circuitry is to signal expiration of the PUSCH validity timer from the physical layer to a MAC layer.

12. The wireless communication apparatus of claim 11, wherein the processing circuitry is to process the PUSCH transmission at the MAC layer based at least in part on the expiration of the PUSCH validity timer signaled by the physical layer.

13. The wireless communication apparatus of claim 6, wherein the wireless communication apparatus is a user equipment or a portion thereof.

14. A wireless communication apparatus comprising:
   means for receiving a physical uplink shared channel (PUSCH) trigger A;
   means for monitoring for a PUSCH trigger B for a PUSCH transmission;
   means for determining the PUSCH trigger B has not been received prior to expiration of a PUSCH validity timer, wherein the wireless communication apparatus is not to perform the PUSCH transmission based on the determination; and
   means for starting, at a medium access control (MAC) entity, one or more discontinuous reception (DRX) timers based on the determination that the PUSCH trigger B has not been received prior to the expiration of the PUSCH validity timer.

15. The wireless communication apparatus of claim 14, wherein the means for monitoring for the PUSCH trigger B includes means for monitoring for the PUSCH trigger B by a physical layer.

16. The wireless communication apparatus of claim 14, wherein the PUSCH trigger B is a one bit trigger in a physical downlink control channel (PDCCH) downlink control information (DCI) scrambled with a common control radio network temporary identifier (CC-RNTI).

17. The wireless communication apparatus of claim 14, further comprising:
   means for identifying a duration of the PUSCH validity timer, wherein the means for starting the one or more DRX timers is to start the one or more DRX timers upon expiration of the PUSCH validity timer.

18. The wireless communication apparatus of claim 17, wherein the means for monitoring for the PUSCH trigger B includes means for monitoring, at the MAC entity, a physical downlink control channel (PDCCH) for the PUSCH trigger B until expiration of the PUS CH validity timer.

19. The wireless communication apparatus of claim 17, wherein the means for identifying the duration of the PUSCH validity timer is to identify the duration of the PUSCH validity timer in a downlink control information (DCI) transmission.

20. The wireless communication apparatus of claim 14, further comprising means for waiting for retransmission of the PUSCH transmission at the MAC entity in response to the determination that the PUSCH trigger B has not been received.

21. The wireless communication apparatus of claim 14, wherein the wireless communication apparatus is a user equipment or a portion thereof.

* * * * *

UNITED STATES PATENT AND TRADEMARK OFFICE
CERTIFICATE OF CORRECTION

PATENT NO. : 11,101,959 B2  
APPLICATION NO. : 16/487788  
DATED : August 24, 2021  
INVENTOR(S) : Jeongho Jeon et al.

Page 1 of 1

It is certified that error appears in the above-identified patent and that said Letters Patent is hereby corrected as shown below:

In the Claims

Column 34, Line 13, in Claim 18, delete "PUS CH" and insert -- PUSCH --.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*